UNITED STATES PATENT OFFICE.

HERMANN OEHME, OF COLOGNE-ON-THE-RHINE, GERMANY, ASSIGNOR, BY MESNE ASSIGNMENTS, TO THE CHEMICAL FOUNDATION, INC., A CORPORATION OF DELAWARE.

PROCESS FOR THE PREPARATION OF DINITROGLYCOL AND ITS HOMOLOGUES.

1,426,313.  Specification of Letters Patent.  Patented Aug. 15, 1922.

No Drawing.  Application filed June 27, 1919.  Serial No. 307,234.

*To all whom it may concern:*

Be it known that I, HERMANN OEHME, a citizen of the German Republic, residing at Cologne-on-the-Rhine, Germany, have invented certain new and useful Improvements in a Process for the Preparation of Dinitroglycol and Its Homologues, of which the following is a specification.

Ethylene or similar unsaturated gaseous hydrocarbons treated with a mixture of concentrated sulphuric and nitric acids yield oils of a yellowish color and explosive character which possess high blasting power. They may be employed in the place of nitroglycerin, because these oils are especially suitable for the preparation of dynamite-like products or for gelatinization with nitrated cellulose.

It has been observed that the oils after standing for some length of time deposit an amorphous substance. At the same time the oils turn acid and the acid reaction gradually increases until they no longer show the stability test prescribed. The decomposition can be deferred for a long time by the addition of the stabilizing means of common use.

I have found that these oils behave altogether differently from nitroglycerin, dinitroglycol and similar compounds when treated with solutions of the carbonates or bicarbonates of alkali metals.

On digesting the oils with aqueous alkaline solutions the temperature of the mass rises more or less according to the concentration of the alkaline solutions. Gradually a solid substance is precipitated, the amount of which corresponds to the quantity of the alkali used. By filtration, pressing or extraction a fraction of the quantity of the oil originally employed is recovered in a purified state.

I also noticed the rather surprising fact, that when employing specific quantities of an alkali carbonate or bicarbonate an oil is recovered, which shows altogether different properties compared with the original oil. The quantities of alkalis correspond to their chemical equivalents.

The purified oil is neutral and does not alter its composition on standing. It also stands the stability tests. I indicated by elementary analysis and by determination of the molecular weight that I had before me a totally different compound. Whereas the original oil of nitrated ethylene contains 18.9% nitrogen and has a molecular weight of 168, the nitrated ethylene treated with an alkaline solution only contains 18.3% nitrogen and has a molecular weight of 158. Further investigations of the substance convinced me that the purified oil consisted of dinitroglycol. Although its theoretical molecular weight in a pure state is 152, dinitroglycol has a tendency to form associations during the determination of its molecular weight which was proved by repeated determinations of pure dinitroglycol which yielded figures differing from 159 to 162.

In an analogous manner I can prepare from the nitrated products of higher homologues of unsaturated hydrocarbons the nitro compounds of the corresponding higher glycols.

As mentioned above, I can recover the purified oil by filtration, pressing or extraction. In the aqueous solution there remains besides the solid substances nearly all the alkali applied in the form of an alkali-metal nitrate. The solid substance is nearly insoluble in all the solvents usually employed. It contains nitrogen and much carbon and exhibits no explosive properties.

Preferably the concentration of the alkaline solutions should not be too strong, as otherwise the temperature rises too high. The properties of the recovered purified oil are not influenced by the changing concentration of the alkali.

*Example.*

100 parts of nitrated ethylene are well mixed with 40 parts of ammonium bicarbonate in a 10% aqueous solution. During the first quarter of an hour a strong liberation of nearly pure carbon dioxide takes place. After that time the reaction slackens and is finished after the lapse of about 40 minutes. The purified oil is recovered with a yield of about 50% of the nitrated oil originally used.

If sodium bicarbonate be employed, I need not apply a solution, but can apply a suspension with an equally good result.

Having now described my invention what I claim as new and desire to secure by Letters Patent, is:—

1. A process for the preparation of dinitroglycol and its homologues consisting in treating the nitrated product obtained by the action of a nitrating acid on an unsaturated hydrocarbon with an alkali metal carbonate.

2. A process for the preparation of dinitroglycol and its homologues consisting in treating the nitrated product obtained by the action of a nitrating acid on an unsaturated gaseous hydrocarbon, with a solution of an alkali-metal carbonate, essentially as described.

3. A process for the preparation of dinitroglycol and its homologues consisting in treating the nitrated product obtained by the action of a nitrating acid on an unsaturated gaseous hydrocarbon, with a solution of an alkali-metal bicarbonate, essentially as described.

4. A process for the preparation of dinitroglycol and its homologues consisting in treating the nitrated product obtained by the action of a nitrating acid on an unsaturated gaseous hydrocarbon, with a suspension of sodium bicarbonate in water, essentially as described.

HERMANN OEHME.